Feb. 18, 1936.   H. D. VAN BRUNT   2,031,517
BRAKE
Filed Oct. 23, 1933   3 Sheets-Sheet 1
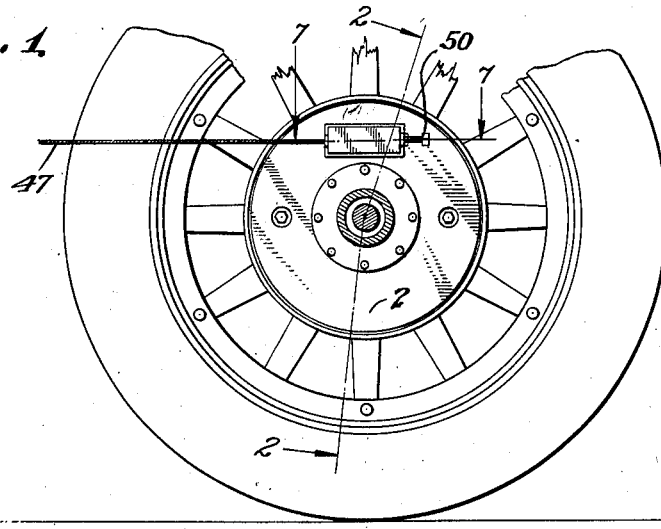
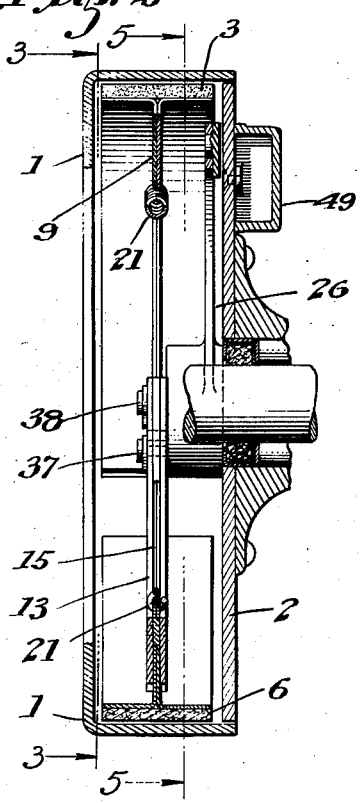
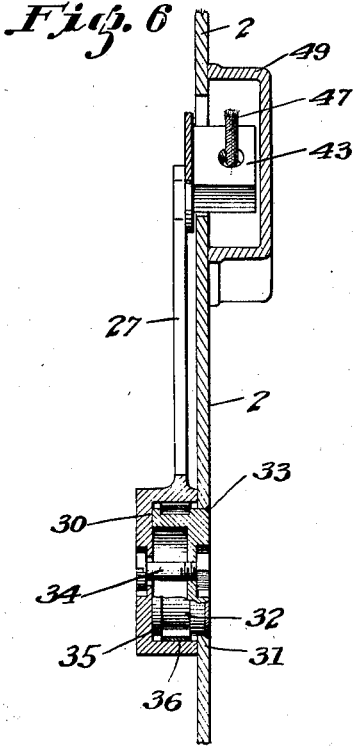
INVENTOR
Harry D. Van Brunt.
BY Calvin Brown
ATTORNEY Feb. 18, 1936.                H. D. VAN BRUNT                2,031,517
                                   BRAKE
                          Filed Oct. 28, 1933           3 Sheets-Sheet 2
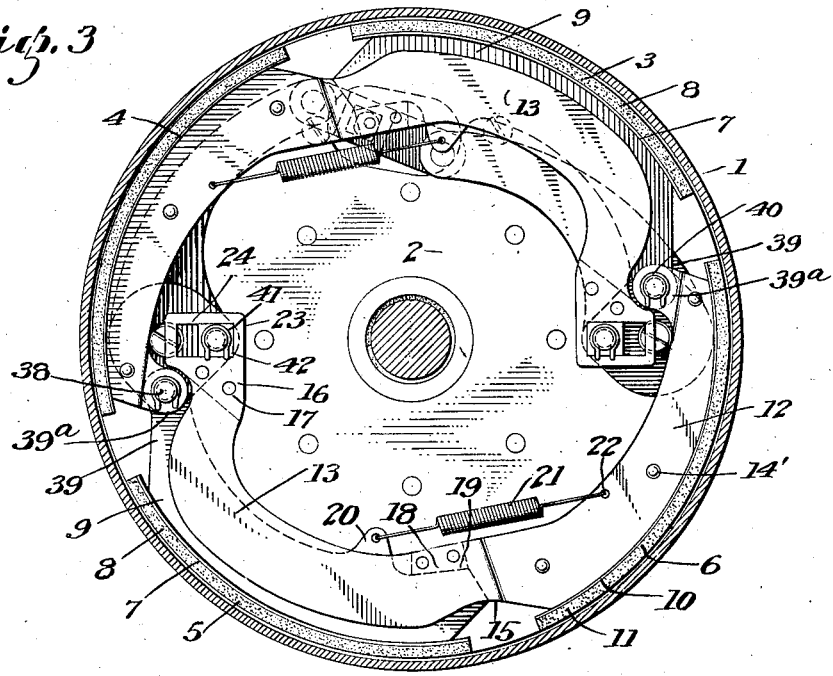
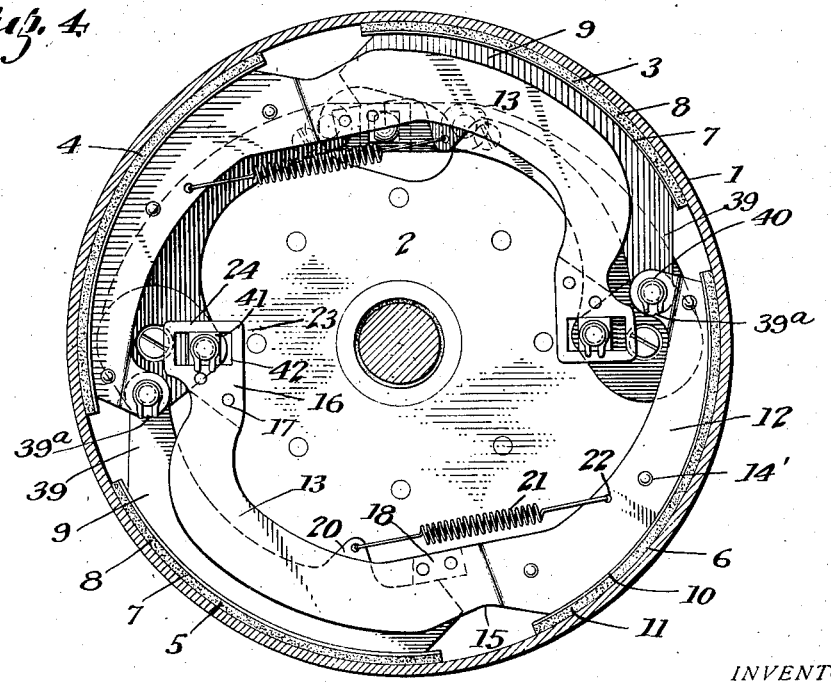
INVENTOR,
Harry D. Van Brunt;
BY
*Calvin Brown*
ATTORNEY Feb. 18, 1936.  H. D. VAN BRUNT  2,031,517
BRAKE
Filed Oct. 23, 1933  3 Sheets-Sheet 3

INVENTOR
Harry D. Van Brunt.
BY
ATTORNEY

Patented Feb. 18, 1936

2,031,517

UNITED STATES PATENT OFFICE 2,031,517

BRAKE

Harry D. Van Brunt, Los Angeles, Calif.

Application October 28, 1933, Serial No. 695,620

8 Claims. (Cl. 188—78)

This invention relates to improvements in brakes, and has for an object the provision of a brake which is at all times positive in operation. Said brake contemplated by this invention is of the internally expanding type utilizing a plurality of segmental shoes.

An object of the invention is to provide a brake construction whereby the said shoes are moved into brake drum engagement with equal pressure.

Another object is the provision of a brake of the character stated, wherein the several brake shoes are equalized as to pressure exerted thereby against the drum.

In multiple internally expanding brake shoes, it sometimes happens that certain of the brake shoes, for various reasons, do not move equally. When this defect occurs, ordinarily one of the shoes will grip the drum, the other shoes having but slight friction with the drum or no engagement at all. With my invention, I provide suitable means whereby all of the shoes will move substantially an equal amount, the shoe having the least movement being retarded in order that a shoe having a greater distance to travel may move and thus have all of the shoes engage a surface of the drum.

An object of the invention is the provision of means which operates automatically to provide for an equalization in movement of the brake shoes.

Another object is to so simplify the brake design as to provide practically no parts liable to damage or breakage.

Another object is the provision of a brake which may be easily adjusted without the necessity of completely dismantling the brake or removing the wheels.

Another object of the invention consists in the tandem interrelation of various brake shoes in such a manner that any stress set up in one shoe is communicated to the adjacent shoe for the purpose of equalizing stresses.

Another object is the provision of a brake which is rattle-proof.

Another object is the provision of a brake which requires practically no attention after once installed.

Another object is the provision of a brake in which the parts may be formed of a light material, with the result that simple stampings may be resorted to and expensive parts entirely eliminated.

Another object is the provision of a brake which is simple of construction, fool-proof in operation, requires very little pedal force to apply the brake and which, from a manufacturing standpoint, is less expensive than brakes that the inventor is now familiar with, of fewer parts, and generally superior.

With the above and other objects in view, the invention consists in the novel and useful provision, formation, construction, association and relative arrangement of parts, members and features, all as shown in a certain embodiment in the accompanying drawings, described generally, and more particularly pointed out in the claims.

In the drawings:

Figure 1 is a fragmentary side elevation of the invention applied to a wheel,

Figure 2 is a sectional view on the line 2—2 of Figure 1,

Figure 3 is a sectional view on the line 3—3 of Figure 2,

Figure 5:
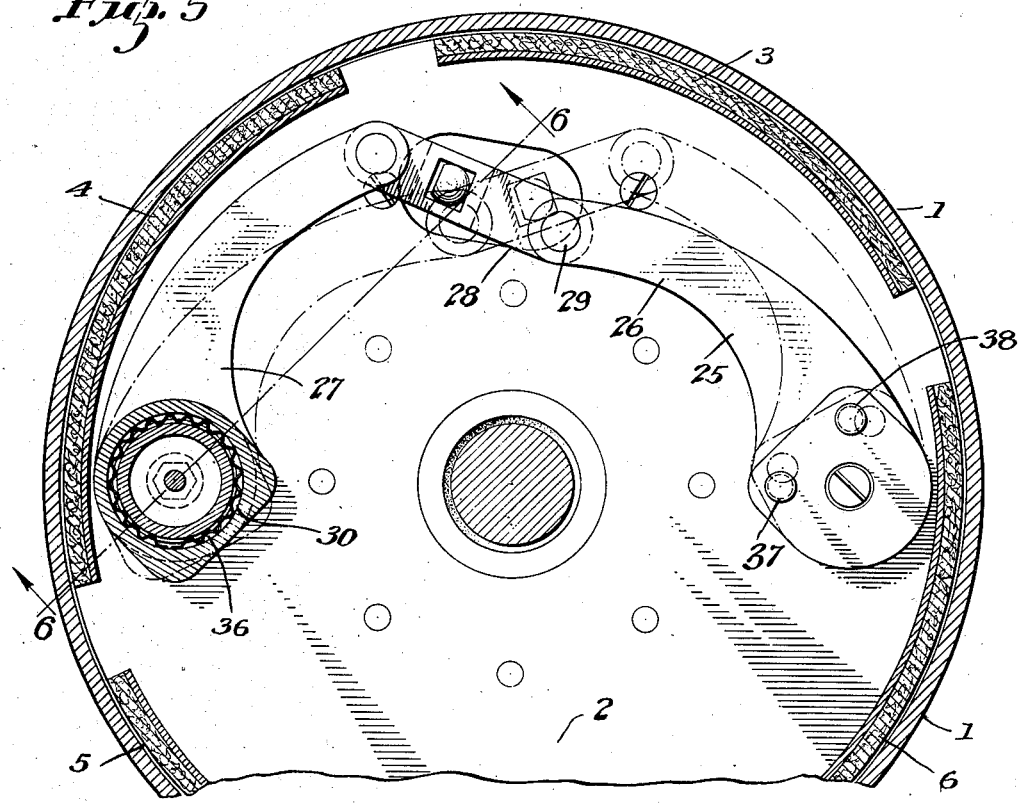
Figure 7:
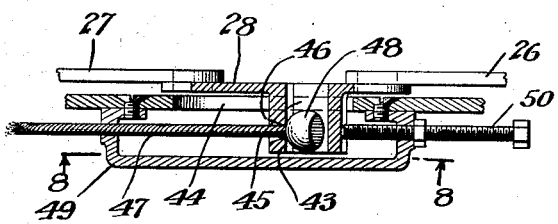
Figure 8:
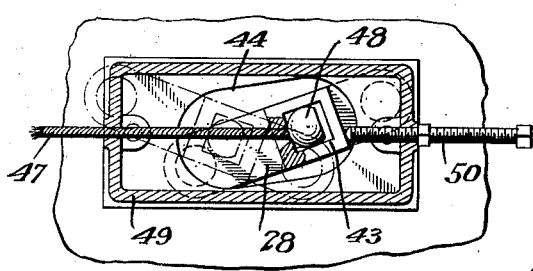

Figure 4 is a view similar to Figure 3, the brake shoes being in changed relationship relative to a drum, Figure 5 is a sectional view on the line 5—5 of Figure 2, Figure 6 is a sectional view on the line 6—6 of Figure 5, Figure 7 is a fragmentary sectional view on the line 7—7 of Figure 1, and, Figure 8 is a fragmentary transverse sectional view on the line 8—8 of Figure 7.

Referring with particularity to the drawings, I have, by this invention, provided a new form of internally expanding brake comprising a plurality of segmental shoes adapted in the embodiment of the invention about to be described, to work in tandem. The particular brake shoes are so inter-related that like pressure is exerted by all said brake shoes against a brake drum, to the end that even braking action occurs.

Referring to the drawings, 1 is a drum and 2 a backing or anchor plate adapted to carry the various braking elements. In this instance, the braking elements include four segmental brake shoes 3, 4, 5 and 6. The brake shoes 3 and 5 are identical in construction as are likewise the brake shoes 4 and 6. Therefore, like reference characters will be applied to like brake shoes. The brake shoes 3 and 5 both include a portion 7 adapted to have secured thereto brake lining 8. The portion 7 is centrally provided with a web 9. The shoes 4 and 6 are both provided with a part 10 provided with lining 11 and with a webbing 12. In the present instance, this webbing is provided with an extended arm 13. It will be observed that all of the said shoes, with the exception of the lining, comprise two cooperating members (see Figure 2). In the case of the shoes 4 and 6, the two webbing members are secured together by rivets or the like 14, and the same may be true for the webbings 9 of the shoes 3 and 5, although in the present instance, said webbings are welded together, the weld not being shown. The arm portions 13 constituting an extension of the webbings 12 are separated at 15 to provide two parallel members and again secured together adjacent an end of said arm member, as shown at 16, being held by any suitable means, such as rivets or the like 17.

The arm generally conforms to the curvature of the webbings 9 of the brake shoes 3 and 5. The webbings 9 are adapted to be received within the space 15 of the arm members 13. A block 18 is confined in the space 15 and secured between the two members of the arm 13 and the webbing 9 is adapted to contact at one end with said block 18 to limit inward radial movement thereof, as indicated by the dotted lines in Figure 3 at 19. The webbing 9 is provided with a perforated lug 20 which extends beyond the surface of the arm members 13 and a coil spring 21 is hooked between said perforated lug 20 and the webbing 12, as shown at 22. It will thus be seen that the brake shoes 5 and 6 are closely nested together in contiguous end relationship and that the two segmental shoes are held in substantially the same plane at all times. In other words, the arm members 13 constitute an extension of the webbing 12 closely nesting the webbing 9 therebetween and any tendency of the webbing 9 to move sideways is prevented. This is a feature of importance in this brake and acts as an assurance that the brake shoes will at all times track. The end 16 of the arm members is headed or enlarged, as shown at 23, and formed with an elongated transverse slot 24.

In order to move the brake shoes into or out of drum engagement, I have provided actuating means 25 comprising in the present instance two levers 26 and 27 having ends interconnected by means of a link 28. As both levers 26 and 27 are identical in construction, one thereof will be described. The lever 26 is provided with an opening adapted to receive a stud 29 carried by an end of the link 28. The opposite end of said lever is enlarged and annularly chambered at 30 (see Figures 5 and 6). This chambered end may function in the role of a hub. The backing or anchor plate 2 is cut away at 31 to receive a stud or boss 32, the said boss being confined within the hub. This boss may be held to the backing plate in any approved manner, such as by welding, as indicated at 33. Furthermore, the said boss and hub are held in cooperative relation by any suitable securing means, such as by a counter-sunk nut and bolt combination 34. The said boss is annularly grooved at 35 and the periphery of the boss is within the inner annular surface of the hub. Adapted for placement within the annular groove 35 and bridging the space between the periphery of the boss and the inner annular surface of the hub is a sinuous or crimped annular spring 36. The head and shank of the nut and bolt combination 34 is allowed limited movement relative to the hub. Thus, the said arm may be moved so as to compress the crimped annular spring 34 at various portions thereof. The hub portion is externally provided with a pair of spaced studs 37 and 38. The webbings 9 and 12 are provided with perforated lugs 39 and 39a, which lugs are jointly carried on the stud 38 and maintained in position thereon by a U-shaped clip 40; the stud being annularly grooved to receive the clip. The stud 37 carries a slide block 41 movable within the elongated slot 24 and a U-shaped spring clip 42 received within an annular groove in the said stud 37 is adapted to hold the slide block and arm in position of assemblage.

The said link is provided with an enlargement 43 on one face thereof and the enlargement is passed through an elongated slot 44 in the backing or anchor plate 2. The enlargement is provided with a through bore 45 which may be substantially square in cross section. It is likewise provided with an outwardly flared transverse bore 46. A control cable 47 is passed through the conical bore 46 and a head 48 within the bore 45 is secured in the ordinary manner to an end of the cable. A cover 49 is adapted to be secured to the backing or anchor plate on the outer surface thereof and over that zone of the anchor plate containing the elongated slot 44. As before stated, this said link secures two ends of the levers 26 and 27 together. It is sometimes necessary to adjust the relative pivot positions of the two levers, and to do this, I have provided link adjusting means comprising an adjustable screw 50 adapted to bear against a surface of the enlargement 43 for the purpose of positioning the link.

The operation, uses and advantages of the invention just described are as follows:

The present brake may be utilized for purposes other than for automobiles, as is obvious. The brakes may be applied to both the front and rear wheels of a vehicle, as is universal practice in motor vehicles today. Furthermore, I may, in certain installations, dispense with certain of the brake shoe units, particularly where the brakes are applied to the front wheels. It is apparent that each contiguous pair of shoes, such as shown at 3 and 4, may be operated conjointly without the pair 5 and 6 being present, or vice versa.

If we assume that a brake with its component elements has been assembled, as shown in Figure 3, upon movement of the control cable 47 in one direction, the link 28 may be moved from the solid line position of Figure 5 to the dotted line position in the same figure. As the dotted lines indicate, both levers 26 and 27 are moved in a clockwise direction, viewing Figure 5. This movement will move the brake shoes from the position shown in Figure 3 to the position shown in Figure 4 where all of the brake shoes engage the drum. When the arms 26 and 27 move clockwise, viewing Figure 3, the studs 37 and 38 will move relative to the holding means 34 as a center. As a consequence, the studs 37 move the slide blocks 41 within the elongated slots 24 of the arms 13. Both arms 13 tend to move in a clockwise direction as the levers 26 and 27 are moved. The shoes 3 and 5 carried by the studs 38 also tend to move in a clockwise direction. A certain degree of separation will then occur between contiguous brake shoes, to-wit, the brake shoes 5 and 6 and 3 and 4. It will be observed that the ends 19 of the brake shoes 3 and 5 slide upon the blocks 18 during relative movement between the brake shoes. As above illustrated, in Figures 3 and 4, when the control cable is released, the coil springs 21 tend to return the brake shoes to out of drum engagement, or from the position of Figure 4 to that of Figure 3. If we assume that the lining of one of the brake shoes is considerably thicker than the lining on the other brake shoes, this brake shoe will, upon movement of the levers 26 and 27, engage the drum first. However, no particular pressure will be applied by this shoe to the drum until continued movement of the levers brings the remaining brake shoes into drum engagement. This desired function is accomplished through the medium of the automatic take-up or equalizing device carried by the arms. This device includes the sinuous spring 36. Hence, when one brake shoe engages the drum, in advance of the others, or when the brake shoes are not equalized as to their movement, pressure exerted by the drum engaging shoe will be communicated to the sinuous spring and tend to compress it at one portion thereof. This particular zone will remain compressed while the other shoes are brought into engagement with the drum. In the particular construction and by way of illustration, if we assume that the spacing between the hub and the boss is approximately one-quarter of an inch, then the aggregate distance of movement between the hub and boss of both arms would total almost one-half inch. Consequently, considerable wear can be compensated for.

Whereas with most brakes constant adjustment is necessary to properly space the lining from the brake drum during wear thereof, the present invention affords an automatic equalizer or adjustment, in that the lining is at all times brought into forcible equalized contact with the drum, when the control arms are actuated. The degree of rotation of the arms to permit brake shoe engagement with the drum is regulated by the screw 50. As before stated, the coil springs 21 draw the shoes together and tend to cause the shoes to disengage the drum. Hence, by turning the screw which contacts with the link, movement of the arms 26 and 27 is controlled. This adjustment is external the anchor or backing plate of the brake and is the only adjustment necessary for the brake. Hence, in place of long and complicated brake adjustments, the mechanic may readily regulate the brake by turning the screw 50. Utilizing an ordinary brake tester, it is a simple matter to equalize the four brakes or to so regulate the brakes, both front and rear, that any degree of braking pressure desired for a given pedal movement may be attained. It will thus be seen that the usual form of brake compensator is quite unnecessary with the present invention for the reason that the automatic take up and equalizer device performs such a function.

Taking the invention as illustrated, it will be seen that very few parts are necessary to provide a positively acting brake. Only two coil springs are utilized and the brake would not be inoperative even though both springs should break. This is a feature of importance. The automatic take-up and equalizer is in reality a center shifting device, in that it shifts the radius of movement of the studs relative to the holding means 34. Ordinarily both studs have an equal radius arm relative to the member 34. However, if a portion of the sinuous spring should become depressed, one radius arm would be of greater length than the other thereof, or the length of both radius arms might increase equally and, in the same manner, likewise decrease equally. The inventor is aware that certain complicated devices have been placed on the market for taking up wear of lining but in every instance, so far as the inventor knows, said take-up devices operate to an equal extent upon all of the brake shoes. My present invention differs from a device of this character in that any brake shoe will automatically move a desired distance and stop upon engagement with the drum to permit the other brake shoes to move into drum engagement and provide an equalized shoe engaging pressure against said drum. This function, so far as the inventor knows, has never been accomplished by any prior brake construction.

The brake is readily assembled and disassembled, by merely removing four clips, to-wit, the clips 40 and 42 from the studs. This will permit the brake shoes to be removed. As previously pointed out, the webbings 9 of the shoes 3 and 5 are received between the separated members of the arms 13. A fairly close fit engagement is permitted so that a stress-resisting relationship between the said arm members and the webbings, together with the webbings 12 of the shoes 4 and 6 is effected. In this manner, one of the objects of the invention, to-wit, the maintaining of all the brake shoes in substantially the same plane is afforded.

It is obvious that various changes and modifications and variations may be made in practicing the invention in departure from the particular description and drawings without, however, departing from the true spirit of the invention as defined by the scope of the appended claims.

I claim:

1. In a brake and brake drum construction of the character disclosed, an anchor plate, a pair of levers, means for pivoting said levers at spaced points to said anchor plate, means permitting shifting the rotative centers of said levers relative to said pivot points; a segmental shoe provided with an arm extension, means for one of said levers adjacent the pivot point for securing one end of said shoe, and means on the other of said levers for movably securing the arm extension of said shoe, whereby upon movement of the levers, the shoe is moved, the levers shifting through the first means to effect equalized surface drum engagement with the shoe.

2. In a device of the character disclosed, an anchor plate, a pair of levers both pivotally secured at spaced points to said anchor plate, a linked connection between said levers whereby movement of the link will cause relative movement between the levers, both levers being provided with a pair of studs in the zone of the pivot points thereof; two pairs of segmental shoes, contiguous ends of one shoe of both pairs being carried by one of the studs of a lever and the adjacent shoe of both pairs being provided with an extended arm member carried by the other stud of each lever, and whereby when the link is moved to move the said levers, there is relative movement between the shoes.

3. In a device of the character disclosed, a lever provided at one end with a hub portion, a boss spacedly received within said hub, and an annularly arranged sinuous spring between the boss and hub, whereby the hub may be shifted as to radial position relative to the boss during movement of said lever.

4. In a device of the character disclosed, a lever provided at one end with a hub portion, a boss spacedly received within said hub portion, means for securing the boss and hub in working relation, and an annular sinuous spring between the boss and hub, whereby said hub may be shifted relative to the first named means to shift the center of rotation of the lever.

5. In a brake, drum combination as disclosed, an anchor plate, a pair of levers both provided with a hub portion, a pair of bosses secured to said anchor plate, resilient means between said hub and bosses, a link interconnecting said levers in such a manner that shifting of the link will cause relative movement of said levers, segmental shoes carried by the hub portion of both said levers and adapted to be moved when the link is shifted; said resilient means permitting one of said shoes to stop movement during movement of the levers upon contacting a drum, the other shoe continuing to move, and means external the anchor plate adapted to contact with said link to shift the relative position thereof to in turn shift said levers to regulate the spacing between the segmental shoes and said drum.

6. In a brake and brake drum construction of the character disclosed, an anchor plate, a pair of levers, means for pivoting said levers at spaced points to said anchor plate, means permitting shifting the rotative centers of said levers relative to said pivot points; a segmental shoe provided with an arm extension, means for one of said levers adjacent the pivot point for securing one end of said shoe, and means on the arm extension for movably securing the arm extension to the other of said levers, whereby upon movement of the levers, the shoe is moved, the levers shifting through the first means to effect equalized surface drum engagement with the shoe, in combination with an adjustable screw external the anchor plate for limiting movement of the pair of levers in one direction.

7. In a device of the character disclosed, a lever provided at one end with a hub having a circular socket, a boss spacedly received within the said socket of the hub, and an annularly arranged spring within said socket and bearing against said hub for constantly urging the hub and boss into concentric relationship.

8. In a brake and brake drum construction of the character disclosed, an anchor plate, a pair of levers, means for pivoting said levers at spaced points to said anchor plate, means permitting shifting the rotative centers of said levers relative to said pivot points; a segmental shoe provided with an arm extension, means for one of said levers adjacent the pivot point for securing one end of said shoe, and means on the arm extension for movably securing the arm extension to the other of said levers, whereby upon movement of the levers, the shoe is moved, the levers shifting through the first means to effect equalized surface drum engagement with the shoe.

HARRY D. VAN BRUNT.